United States Patent
Adamany et al.

(10) Patent No.: US 6,735,429 B1
(45) Date of Patent: May 11, 2004

(54) METHODS AND SYSTEMS TO SUBSTANTIALLY PREVENT FRAUDULENT USE OF A WIRELESS UNIT ROAMING IN A VISITED SYSTEM

(75) Inventors: Robert Andrew Adamany, Alpharetta, GA (US); Richard L. Charbono, Jr., Snellville, GA (US); Edward Lawrence Didion, Dover, FL (US); Ann M. Catanese, Odessa, FL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 443 days.

(21) Appl. No.: 09/586,323

(22) Filed: Jun. 2, 2000

Related U.S. Application Data

(63) Continuation of application No. 09/434,135, filed on Nov. 5, 1999, now abandoned.
(60) Provisional application No. 60/107,224, filed on Nov. 5, 1998.

(51) Int. Cl.[7] .............................. H04M 1/66; H04Q 7/20
(52) U.S. Cl. .................... 455/410; 455/411; 455/432.1; 455/435.1
(58) Field of Search ................................. 455/410, 411, 455/432, 433, 422, 445

(56) References Cited

U.S. PATENT DOCUMENTS

| 4,901,340 A | 2/1990 | Parker et al. |
| 5,142,654 A | 8/1992 | Sonberg et al. |

(List continued on next page.)

FOREIGN PATENT DOCUMENTS

| EP | 0 788 287 | 8/1997 |
| WO | WO 93/11646 | 6/1993 |
| WO | WO 97/17816 | 5/1997 |
| WO | WO 97/26769 | 7/1997 |
| WO | WO 97/36447 | 10/1997 |
| WO | WO 97/38544 | 10/1997 |
| WO | WO 97/42786 | 11/1997 |
| WO | WO 97/47146 | 12/1997 |
| WO | WO 97/47151 | 12/1997 |
| WO | WO 98/02011 | 1/1998 |
| WO | WO 98/19489 | 5/1998 |

OTHER PUBLICATIONS

US 5,282,240, 1/1994, Buhl et al. (withdrawn)

Yu, James I., "Overview of EIA/TIA IS–41," The Third IEEE Interm. Symp. on Personal, Indoor & Mobile Radio Communications, Oct. 19, 1992, pp. 220–224.

Aguilar Cabarrus, E., *PCT Written Opinion*, International Preliminary Examination Authority, Aug. 28, 2000.

*Fraud Management*, GTE website pages.

Primary Examiner—Duc M. Nguyen
(74) Attorney, Agent, or Firm—Cantor Colburn LLP

(57) ABSTRACT

Methods, systems, and apparatus that substantially prevent the fraudulent use of wireless units roaming in visited systems. A visited mobile switching center (MSC-V) registers a wireless unit that is roaming in the visited system, but denies originating communication service to the unit. To make a call, the unit provides a code and identification information. The MSC-V routes the code and identification information to a verification entity. The entity determines whether the wireless unit is a verified or authentic unit. If the wireless unit is a verified unit, the verification entity responds positively to the MSC-V. Based on the verification, the MSC-V removes the denial of originating communication service from the wireless unit. Advantageously, the home system need not be consulted by the MSC-V with respect to the authenticity of the wireless unit.

8 Claims, 4 Drawing Sheets

U.S. PATENT DOCUMENTS

| | | | |
|---|---|---|---|
| 5,282,250 A | 1/1994 | Dent et al. | |
| 5,497,412 A | 3/1996 | Lannen et al. | |
| 5,610,974 A | 3/1997 | Lantto | |
| 5,699,408 A | 12/1997 | Krolopp et al. | |
| 5,724,658 A | 3/1998 | Hasan | 455/445 |
| 5,734,700 A | 3/1998 | Hauser et al. | |
| 5,867,788 A | 2/1999 | Joensuu | |
| 5,884,158 A * | 3/1999 | Ryan, Jr. et al. | 455/410 |
| 5,915,220 A | 6/1999 | Chelliah | |
| 5,943,619 A | 8/1999 | Coyne et al. | |
| 5,978,678 A | 11/1999 | Houde et al. | |
| 6,006,094 A | 12/1999 | Lee | |
| 6,011,975 A | 1/2000 | Emery et al. | |
| 6,026,298 A | 2/2000 | Lamb et al. | |
| 6,035,198 A | 3/2000 | Wiehe | 455/445 |
| 6,039,624 A | 3/2000 | Holmes | |
| 6,041,231 A * | 3/2000 | Suzuki | 455/422 |
| 6,058,301 A * | 5/2000 | Daniels | 455/411 |
| 6,301,472 B1 * | 10/2001 | Nakasu et al. | 455/405 |

* cited by examiner

METHODS AND SYSTEMS TO SUBSTANTIALLY PREVENT FRAUDULENT USE OF A WIRELESS UNIT ROAMING IN A VISITED SYSTEM

This application is a continuation of U.S. application Ser. No. 09/434,135 filed with the U.S. Patent Office on Nov. 5, 1999 now abandoned.

RELATED APPLICATION DATA

The present application claims priority to and the benefit of the prior filed copending and commonly owned provisional application entitled "SCP/International Gateway—An SS7 Network Element That Performs SS7 Message Routing, Call Delivery and PIN Fraud Protection for Cellular Users Roaming Internationally", filed in the United States Patent and Trademark Office on Nov. 5, 1998, assigned application Ser. No. 60/107,224, and incorporated herein by reference.

TECHNICAL FIELD

This invention relates to telecommunications, and in particular, to the substantial prevention of the fraudulent use of a wireless unit that is roaming in a visited wireless communications system.

BACKGROUND OF THE INVENTION

A distinguishing feature of humans as a species is our ability to communicate with each other. Our methods of communication have become ever more sophisticated and have led to the development of wireless communications. Generally, wireless communications are communications that are transmitted through the use of radio frequency (RF) technology. Wireless communications include communications that are transmitted through the use of wireless units such as cellular telephones, mobile telephones, car phones, personal communication service (PCS) units, pagers, and the like.

A wireless unit is particularly useful to a person on the move. For example, a person may use his or her wireless unit while driving a car. The wireless communications service to the person's wireless unit is provided typically by a service provider that may also be referred to herein as a carrier. Typically, a person who obtains wireless communications service from a service provider is generally referred to herein as a subscriber, a customer, or a user. A subscriber may make or receive communications with his or her wireless unit. The term "communication" is used herein to refer to any call, message, announcement or other exchange of data or information, whether analog or digital, that may be received on a wireless unit or transmitted from a wireless unit, and/or may be received or transmitted from a wireless unit that is operating as part of any other device such as a computer, or the like.

When a user initiates a communication on his or her wireless unit, a base station in or serving a predetermined geographic area wherein the subscriber is located receives the communication. The geographic area that is served with wireless communications service is referred to herein as the service area of the service provider. The service provider typically operates a wireless communications network or system to provide wireless communications service to the geographic area. The wireless communications network includes the referenced base station, and other elements such as the mobile switching centers (MSCs). The wireless communications network also includes elements that interface with the public switched telephone network (PSTN), and other networks and systems so as to provide for communications between and among parties using wireless units, using wireline units, or other communications devices.

Upon receipt of a communication from a wireless unit of a user, the base station transmits the communication to a mobile switching center (MSC) (sometimes referred to as a mobile-service switching center or mobile telecommunications switching office (MTSO)). In response to the receipt of the communication, the MSC further routes the communication as appropriate. This routing may take the communication to and through the PSTN, to and through the same wireless communications system, to and through another wireless communications system, to and through another type of communications system, or combinations thereof.

In addition to making a call, a subscriber may receive a communication on his or her wireless unit from a caller. The caller directs his or her communication to the number associated with the subscriber's wireless unit, which is referred to herein as the mobile number (MN) of the wireless unit. The mobile number may be the mobile identification number (MIN) of the wireless unit. The communication is routed through the PSTN, through other networks, and/or wireless communications systems until the communication reaches the MSC serving the subscriber's wireless unit. This MSC may be referred to as the serving MSC or the serving switch. The serving MSC then further routes the communication to the wireless unit.

As noted, a wireless unit is particularly useful when a subscriber is on the move such as when the subscriber is driving a car. The subscriber's mobility may take the subscriber out of the service area served by the service provider from whom the subscriber subscribes. In other words, the subscriber's mobility may take the subscriber out of his or her home service area served by his or her home service provider or home carrier. The subscriber may move so as to be located in another service area that is served by a different service provider with whom the subscriber has no business relationship. The subscriber is said to be "roaming" out of his or her home service area and may be referred to as a "roamer", "roaming subscriber" in a visited service area that is served by a visited system.

To provide a roaming subscriber with communications service, service providers have agreed to follow certain procedures in the processing of communications with respect to each other's subscribers. Generally, a roaming subscriber is validated and may be authenticated by the visited system, which also may be referred to as the visited service provider. Both of these processes (validation and authentication) are used to prevent fraudulent use of wireless units and for other reasons. General descriptions of these processes and other information about wireless communications systems may be found in the book entitled *Cellular and PCS—The Big Picture* by Lawrence Harte, Steve Prokup and Richard Levine (McGraw-Hill 1997).

Generally, in validation, when a wireless unit initiates a communication in a service area other than its home service area, the visited system serving that visited service area attempts to find the wireless unit's identification (also referred to as registration information) in the visitor location register (VLR) of an appropriate MSC in the visited system (MSC-V). If the visited system does not find the identification, then the wireless unit is determined to be not registered with the visited system. Prior to being provided with communications service in the visited system, a wireless unit typically needs to be registered in the visited system.

To register the wireless unit in the visited system, the MSC-V takes certain actions. Using the wireless unit's identification (which generally may include its mobile number, and electronic serial number (ESN), and/or mobile identification number (MIN)), the visited system sends a message to the wireless communications system ("home system") which generally provides wireless communications service to the subscriber. The message from the visited system to the home system is a message requesting validation of the visiting wireless unit. The home system typically checks a home location register (HLR) in an appropriate MSC (MSC-H) of its system, and compares the identification regarding the wireless unit to determine if the wireless unit is valid. If the wireless unit is valid, then the HLR of the home MS,C (MSC-H) responds to the serving MSC in the visited system that the validation was successful or positive. The HLR in the home system generally keeps track of the information about the location of its subscriber in a visited system for use in the future routing of calls, etc.

After the serving MSC in the visited system receives confirmation that the visiting wireless unit is valid, the communication initiated by the visiting wireless unit is processed. The VLR of the serving MSC may then temporarily store the visiting wireless unit's information to validate the identity of the wireless unit itself rather than requesting validation from the home system again for the next call from that wireless unit.

The above-described processes of registration including validation of a roaming wireless unit with its home system are efforts that have been generally put into place to assist in the prevention of the fraudulent use of wireless units. Despite these efforts, wireless units, and in particular, wireless units roaming in visited systems are being fraudulently used.

One of the drawbacks of the above-described validation processes is that typically the validation processes cannot detect illegally cloned wireless units or other fraudulent uses of a wireless unit. To combat such fraudulent uses of a wireless unit, a process generally referred to as "authentication" of a wireless unit has been used. Authentication is the exchange and processing of information to confirm a wireless unit's identity and association with a particular subscriber.

An example of authentication is now described with respect to a wireless unit that enters a visited system. The visited system searches for the wireless unit's identification in its VLR and determines that the wireless unit is not registered. The visited system uses the wireless unit's identification (or other information such as authentication information obtained from the wireless unit) to request authentication of identity from the subscriber's home system. The request for authentication may be, separate or may be combined with the request for validation. With respect to authentication, the home system may check an HLR in an appropriate MSC-H of its system and compare the wireless unit's identification or authentication information to stored information to determine if the wireless unit is authentic.

Alternatively, or in addition, the home system or the visited system may check with an authentication center (AC) to determine if the wireless unit is authentic. An authentication center may be an entity of either the home or visited system, or a separate entity. Generally, an authentication center maintains a database, tables, or the like with respect to the identities of wireless units that are served by the AC. When called upon, the AC compares the identification and/or authentication information which has been provided to the AC with respect to a particular wireless unit, and determines whether the particular wireless unit is authentic based on the comparison.

If the wireless unit is determined to be authentic (whether by the visited system, home system, and/or an AC), then this information is provided to the visited system. The visited system may store for a period of time authentication information relating to the wireless unit in a VLR of an appropriate MSC-V. The visited system then may use this stored authentication information rather than contact the home system and/or an AC again. If the wireless unit is validated and determined to be authentic, then the visited system generally provides communications service to the wireless unit.

If the wireless unit is determined to be in authentic (whether by the visited system, home system, and/or an AC), then this information also is provided to the visited system. In response to the finding of a lack of authenticity of the wireless unit, the visited system may deny communications service to the wireless unit, or the visited system may take other actions with respect to the wireless unit.

But the above-described processes have been considered to be insufficient to prevent the fraudulent uses of a wireless unit, and especially, to substantially prevent the fraudulent uses of a wireless unit roaming in a visited system.

Accordingly, there is a need for methods and systems that provide additional safeguards so as to substantially prevent the fraudulent uses of a wireless unit, and especially as the wireless unit roams in visited systems.

SUMMARY

The present inventions include methods, systems, and apparatus that substantially prevent the fraudulent use of wireless units roaming in visited systems. Pursuant to these inventions, a visited mobile switching center (MSC-V) carries out a registration of a wireless unit that is roaming in the visited system. After successful registration, the MSC-V implements at least the denial of originating communication service to the wireless unit. In other words, the wireless unit is allowed to receive calls, but is not allowed to make calls. Advantageously, the present, inventions substantially prevent the fraudulent use of wireless units roaming in visited systems by requiring such units to undergo a verification or authentication process prior to being allowed to make calls.

In particular, as a first action in the authentication process of a wireless unit roaming in a visited system, the wireless unit provides a code and identification information in a call. The MSC-V recognizes the code as a feature request (or the like) with respect to a network element. The MSC-V routes the feature request including the identification information to the network element. In response to receipt of the identification information, the network element checks whether the wireless unit is a verified or authentic unit. If the wireless unit is a verified unit, then the network element responds to the MSC-V with a verification in a feature request response. Based on the verification, the MSC-V removes the denial of originating communication service with respect to the wireless unit. In other words, based on the verification, the MSC-V allows the wireless unit to initiate a call.

In sum, the inventors have determined that fraudulent use of wireless units roaming in a visited system occurs most often with respect to wireless units that are used to fraudulently to make (rather than to receive) calls. Thus, the present inventions implement an authentication or verification process that must be successfully negotiated prior to a wireless unit roaming in a visited system being allowed to make a call.

DETAILED DESCRIPTION

Figure 1:
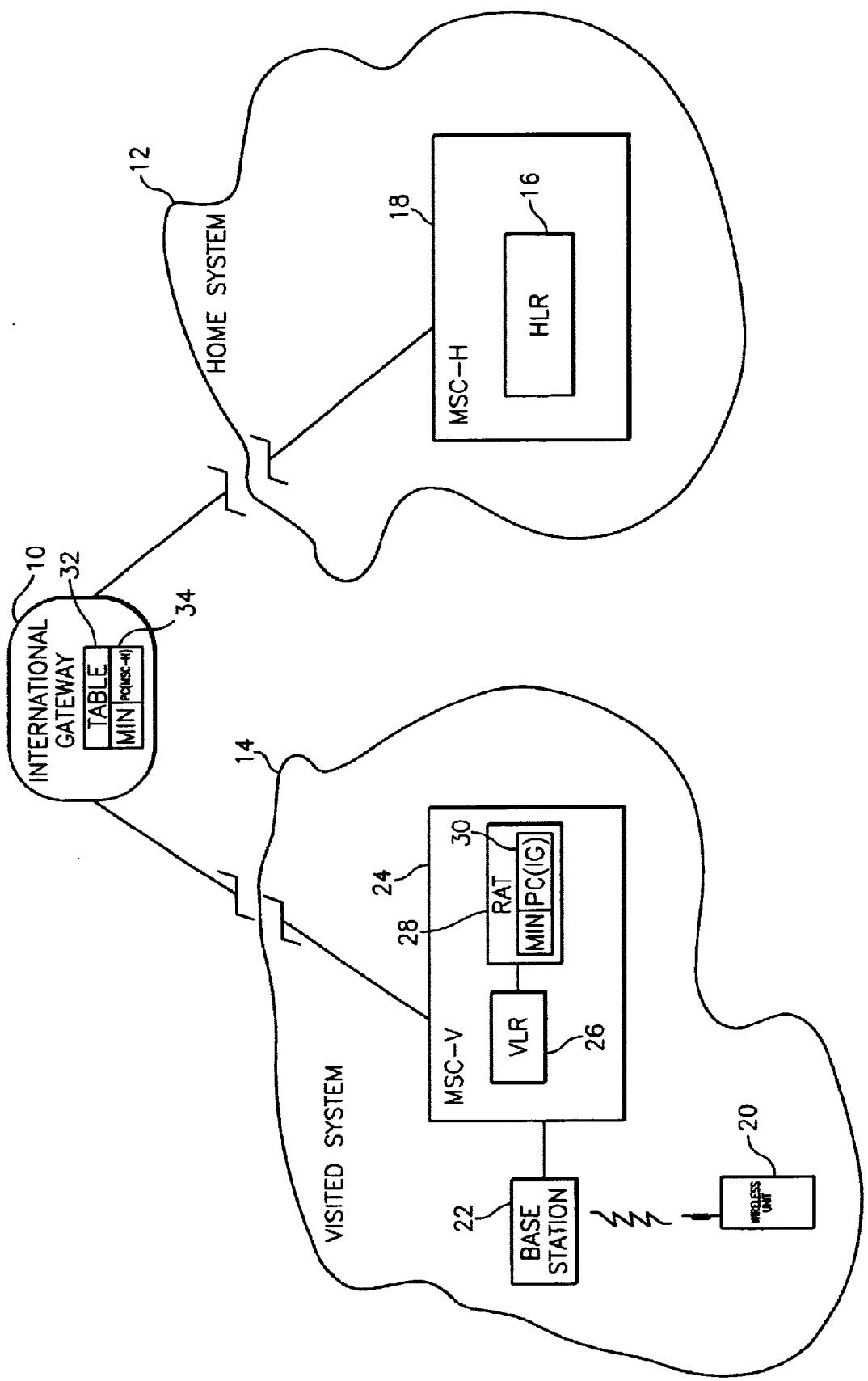
FIG. 1 is a block diagram illustrating use of an exemplary international gateway in an exemplary environment.

The present inventions include methods, systems, and apparatus that substantially prevent the fraudulent use of wireless units roaming in a visited wireless communications system.

Generally stated, a visited mobile switching center (MSC-V) carries out a registration of a wireless unit that is roaming in the visited system. After successful registration, the MSC-V implements the denial of originating communication service to the wireless unit. In other words, the wireless unit is allowed to receive calls, but is not allowed to make calls. Advantageously, the present inventions substantially prevent the fraudulent use of wireless units roaming in a visited system by requiring such units to undergo a further verification or authentication process prior to being allowed to make calls.

In particular, as a first action in the authentication process of a wireless unit roaming in a visited system, the wireless unit provides a code and identification information in a call. The MSC-V recognizes the code as a feature request (or the like) with respect to a network element. The MSC-V routes the feature request including the identification information to the network element. In response to receipt of the identification information, the network element checks whether the wireless unit is a verified or authentic unit. If the wireless unit is a verified unit, then the network element responds to the MSC-V with a verification in a feature request response. Based on the verification, the MSC-V removes the denial of originating communication service with respect to the wireless unit. In other words, based on the verification, the MSC-V allows the wireless unit to initiate a call.

In sum, the inventors have determined that fraudulent use of wireless units roaming in a visited system typically occurs most often when wireless units are used fraudulently to make (rather than to receive) calls. Thus, the present inventions implement an authentication or verification process that must be successfully negotiated prior to a wireless unit roaming in a visited system being allowed to make a call.

Generally, the exemplary embodiments of the present inventions contemplate uses with wireless units such as cell phones and personal communication service (PCS) phones that operate under the standards of Advanced Mobile Phone Service (AMPS), Call Division Multiple Access (CDMA), or Time Division Multiple Access (TDMA). Nonetheless, the principles of the present inventions may be applied to other communication devices operating under other standards with the appropriate reconfiguration, if necessary.

Exemplary embodiments of the present inventions include an international gateway as a network element or verification element for use with the referenced wireless communications. Advantageously, the international gateway may be used in a wireless communications system so as to provide a method, system and/or apparatus of fraud prevention with respect to the use of wireless units in wireless communications systems.

Exemplary embodiments of the present inventions describe the international gateway as a stand-alone unit such as may be embodied by or in a service control point (SCP). But the reader is cautioned the international gateway should not be so limited in embodiment. As well as a stand-alone unit, the international gateway may be incorporated in or as part of another device such as an intelligent peripheral (IP) in a wireless communications system, a network element, a verification element, or in other devices. As a result of the functions the international gateway carries out with respect to fraud prevention, the international gateway also may be referred to herein as a personal identification (PIN) validation platform, or verification or authentication element. Moreover, the international gateway may be considered a series of functions or actions that may be carried out in a single device or that may be carried out through the use of several devices.

In the exemplary embodiments described below, generally the international gateway functions in accordance with Signaling System 7 (SS7) protocols as well as EIA/TIA IS-41 protocols, and thus, may be accessed through the connectivity between and among network elements of wireless communications systems, and/or wireline communications systems, and/or other communications systems. Further, the international gateway may be connected to customer service elements of the service provider of the international gateway, and even may be accessed (or partially) accessed by customers of the service provider of the international gateway through the Internet or other communications networks. For example, the service provider may provide a World Wide Web site accessible to its customers so that the customers may activate, change, or otherwise interact with their respective wireless service and service accounts.

Generally, customers of the service provider of the international gateway also include carriers who provide wireless service to subscribers and who desire to facilitate the provision of wireless service to such subscribers when they are roaming, and particularly roaming in foreign countries or systems. In particular, a customer may enable its subscribers to change their respective personal identification numbers (PINs) used in the authentication or verification processes described herein.

FIG. 1—An Exemplary International Gateway in an Exemplary Environment

FIG. 1 is a block diagram illustrating use of an exemplary international gateway 10 in an exemplary environment including a home system 12 and a visited system 14. The home system 12 generally is a wireless communications system provided by a service provider with whom a subscriber has a relationship such that a wireless unit used by the subscriber typically is registered in a home location register (HLR) 16 of a mobile switching center (MSC-H) 18 when the wireless unit is located in the geographic area served by the MSC-H 18. A communication from a caller and directed to the mobile number of the wireless unit typically is routed to the MSC-H 18 for further routing to the called wireless unit.

FIG. 1 also illustrates a visited system 14 including a wireless unit 20 that is roaming or visiting in the visited system 14. When the wireless unit 20 is turned on, typically it provides registration information to a base station 22 serving the cell of the visiting system wherein the wireless unit 20 is roaming. The registration information typically includes the mobile identification number (MIN) for the wireless unit 20. The base station 22 generally provides the registration information to a mobile switching center (MSC-V) 24.

The actions of the exemplary embodiments in response to the receipt by the MSC-V 24 of the registration information of the wireless unit 20 are further explained in the copending and commonly assigned patent application entitled "Method & Systems for Providing Information to a Home System Regarding a Wireless Unit Roaming in a Visited System", filed on Jul. 23, 1999, in the United States Patent and Trademark Office, and assigned Ser. No. 09/359,515, which is incorporated herein by reference.

Figure 2:
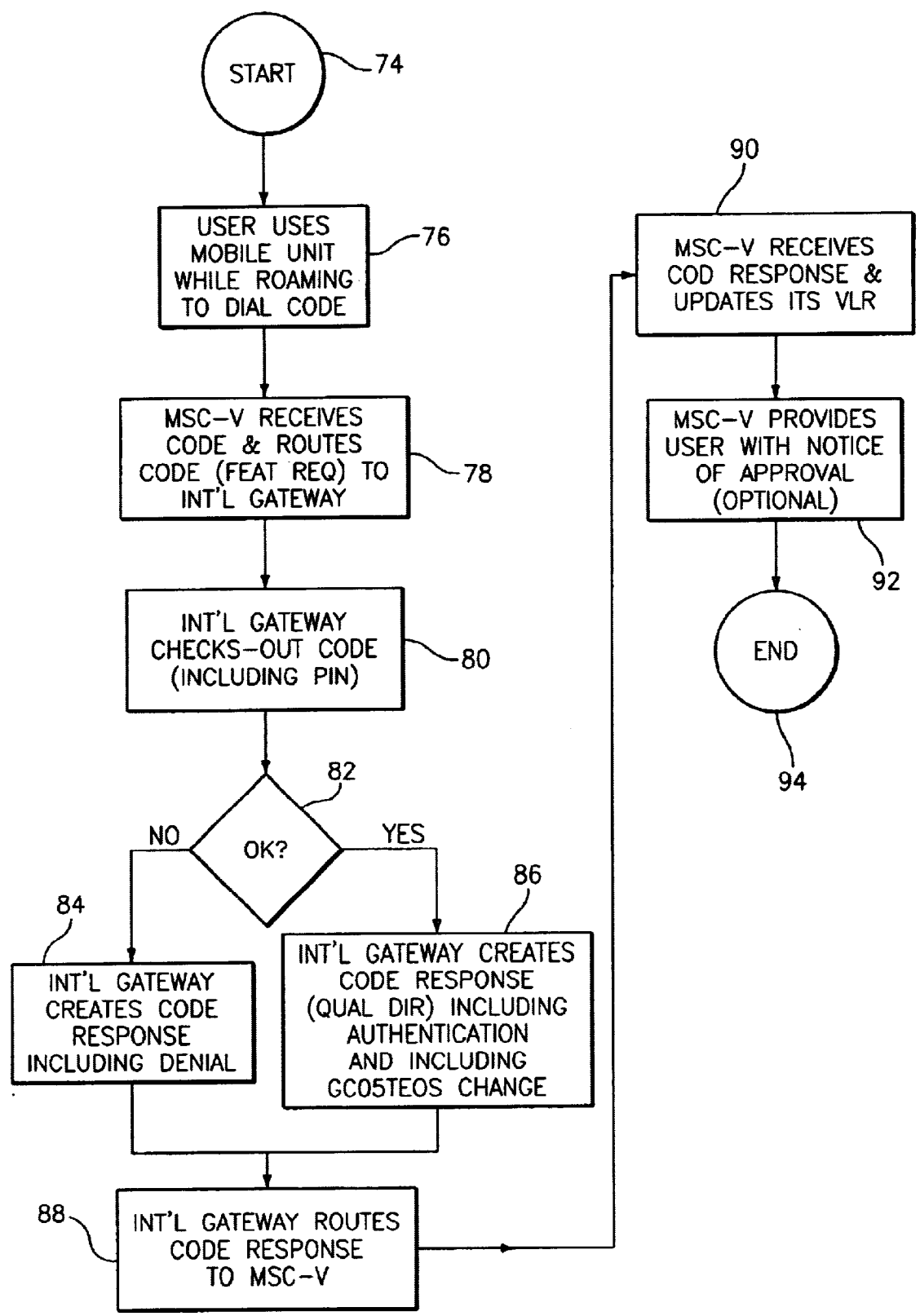
FIG. 2 is a flow diagram illustrating an exemplary method of the present invention.

FIG. 2—An Exemplary Method

FIG. 2 is a flow diagram illustrating an exemplary method to substantially prevent fraudulent use of a wireless unit roaming in a visited system. Generally, to make and/or receive calls, a wireless unit must be registered, and if the wireless unit is located in a visited system, then the wireless unit must be registered with that visited system. The exemplary method of FIG. 2 assumes the wireless unit is registered in the visited system, and further assumes, the wireless unit is blocked in some manner from at least making calls. Preferably, the MSC-V of the wireless unit has implemented a denial of originating service to the wireless unit.

Pursuant to the present inventions, in order to make a call, a wireless unit registered as a roamer in a visited system must pass an authentication or verification process. In other words, the wireless unit must be authenticated or unsecured. An exemplary method for such authentication is illustrated in FIG. 2. If a roamer attempts to make a call prior to such authentication or unsecuring, the MSC-V receives the call, but does nothing with the call. Alternatively, the MSC-V may provide an announcement to the roamer that the wireless unit is unsecured or unauthenticated. In addition, or as yet another alternative, the announcement may instruct the roamer to call or dial a code and then to follow the code with identification information such as a personal identification number (PIN).

Referring to FIG. 2, after start 74, in block 76 the roamer uses his or her wireless unit to dial a code, and the code may be followed by identification information such as the roamer's PIN. As noted, the code may be provided by the MSC-V when the roamer initiates a call, or the code may be provided for use by the roamer when the roamer sets up his or her service agreement with the service provider. The code also may be provided in other ways such as through a customer service bureau, etc. The identification information for a particular user may be obtained by the user generally in the same way as the code is provided to the user, or in other ways. Generally, the identification information includes a four digit PIN with the four digits initially being the first four digits of the last name of the subscriber. If the last name of the subscriber is less than four characters, then fillers such as "9" are used. Of course, the PIN (or other identification information) may be changed, and may be changed through the use of another RemoteFeatureControlRequest message such as "*PINxxxxyyyyyyy".

In block 78, the MSC-V receives the code and the identification information. In the exemplary embodiment, the code is "*PIN". In the exemplary method, the MSC-V recognizes the code as a feature request (FEAT REQ) (also referred to as a RemoteFeatureControlRequest) message, and routes the code (and the identification information) as a FEAT REQ message to the international gateway based on instructions or programming that are included in the MSC-V for use on the occasions the MSC-V receives a call to the code. For example, the MSC-V may route the following to the verification entity: "*PINxxxx". The instructions or, programming included in the MSC-V for use when the MSC-V receives a call to code may provide the MSC-V with an association between the FEAT REQ message and a point code for a verification entity or network element such as an international gateway that is to be used in the authentication process.

Advantageously, the verification entity is not the home system nor the MSC-H of the wireless unit. Thus, the routing of the FEAT REQ message need not be made to the home system or the MSC-H, but instead, is made to the verification entity. By the verification entity not being the home system nor the MSC-H of the wireless unit, the authentication or verification of the wireless unit may be quickly obtained from a centralized device such as the verification entity which may include authentication or verification information for many wireless unit. The serving MSC (the MSC-V) need not spend time and effort in tracking down the home system or MSC-H of the wireless unit to obtain authentication or verification information.

The following Table I provides invoke parameters relating to an exemplary FEAT REQ message:

TABLE I

| MobileIdentificationNumber | MIN of the wireless unit |
| MobileSerialNumber | ESN of the wireless unit |
| Digits | PIN+OldPIN |

The international gateway typically is not located in either the home system 12 nor the visited system 14. The international gateway 10 is functionally connected to the home system 12 and the visited system 14 so as to receive and transmit messages, and in particular SS7 messages, between the home system 12 and the visited system 14. In particular, the international gateway 10 may be functionally connected to the systems 12, 14 such that messages and responses may be routed from a network element such as a signal transfer point (STP) (preferably over A links) to the international gateway 10. Additional information relating to an exemplary international gateway is provided below in a discussion of FIG. 3.

In response to receiving the FEAT REQ message, in block 80, the international gateway generally analyzes the code and the identification information in the message to the extent that the international gateway 10 determines the nature of the message. This determination may include a check-out of the identification information such as the PIN accompanying the code. The international gateway 10 may consult a table 32 including entries 34 for information with respect to the message. In consulting the table, the international gateway may find an entry 34 in the table for the MIN of the wireless unit 20. The entry 34 may provide the international gateway with an association between the MIN for the wireless unit 20 and the ESN and/or the identification information such as the PIN associated with the unit, or other information.

In block 82, a determination is made as to whether the code (including the identification number such as the PIN) checks-out. The code may be said to check-out if the identification information associated with the code includes a match or other correspondence to the information stored in the table 32 of the international gateway with respect to the wireless unit 20. For example, the PIN in the message may be compared to the PIN in the appropriate entry 34 in the table 32. If there is a match or other correspondence, then the code may be said to "check-out". Note: the match or correspondence need not be an identical match, but the necessary closeness or correspondence may be determined and set by the system operator or service provider. For example, if a four digit PIN is used as identification information, then finding of an identity between the PIN in the identification information and the PIN in the entry 34 of table 32 of the international gateway 10 is preferred to determine that the code checks-out.

If the code and identification information does not check-out, then in block 84 the international gateway creates a code response that includes a denial of authentication of the wireless unit. If the code checks-out, then in block 86 the international gateway creates a code response that includes authentication or verification of the wireless unit.

After block 84 or 86, in block 88 the international gateway routes a code response to the MSC-V. The international gateway 10 provides a code response that is routed to the MSC-V from which the code was received. The following Table II provides the result parameters that may be included in the response to the RemoteFeatureControlRequest message that is returned as the result of the authentication process by the international gateway.

TABLE II

| | |
|---|---|
| RemoteFeatureOperationResult = 1 | PIN validation failed |
| RemoteFeatureOperationResult = 2 | PIN validation successful |

In addition, in the exemplary method, the international gateway 10 generates a QualificationDirective message to the MSC-V after a successful authentication or verification process for a wireless unit. The purpose of this message is to remove the denial of service (such as originating service) that was set when the wireless unit registered. The following Table III provides the parameters to be included in the QualificationDirective message to the MSC-V:

TABLE III

| | |
|---|---|
| MobileIdentificationNumber | MIN of the Wireless unit |
| MobileSerialNumber | ESN of the Wireless unit |
| QualificationInformationCode | 3 = Validation and profile |
| SystemMyTypeCode | DEC |
| AuthorizationDenied | 0 : unused |
| AuthorizationPeriod | 0 : unused |
| OriginationIndicator | Restore the saved value (or other to allow service) |
| Digits | Destination |
| TerminationRestrictionCode | Restore the saved value (or other to allow service) |
| CallingFeaturesIndicator | 0 : unused |
| Digits | Carrier Id Code |

In response to the QualificationDirective message, the MSC-V returns a return result for the QualificationDirective message, which informs the international gateway 10 the QualificationDirective message has been accepted.

Referring again to FIG. 2, in block 90, the MSC-V receives the code response and updates its VLR as appropriate. If the code including the identification information such as the PIN check-out, and if a denial of service is in place, then the MSC-V removes the denial of service. The MSC-V 24 also may update its VLR 26 or other databases with respect to the other information related to the wireless unit 20. In optional block 92, the MSC-V may provide the roamer with notice of approval or authentication. For example, a roamer may be provided with three tones to indicate the wireless unit has been authenticated or verified. On the other hand, if the code including the identification information such as the PIN does not check out, then the MSC-V does not take any action to allow use of the wireless unit. Optionally, the MSC-V may provide the roamer with notice of the lack of authentication. In block 94, the exemplary method ends.

Some embodiments of the present inventions allow a user multiple tries or a period of time with respect to authentication or verification of the wireless unit. For example, a user may try to dial a code+identification up to as many as three times in order to obtain originating service for the wireless unit. As another example, a user may repeat the dialing of a code+identification as many times as possible during a period of time. If the user is unsuccessful during that period of time, the wireless unit cannot then be authenticated for at least some period of time. Advantageously, the limitations on the number and time of authentication or verification attempts are yet another fraud prevention feature of some of the embodiments of the present invention.

With the authentication of the wireless unit, and if included, with removal of the denial of originating service, the roamer may attempt to make a call from country B. Advantageously, the service provider is well served by the exemplary method because it reduces the fraudulent use of wireless units. By this method, a roamer is only allowed to make a call in a visited system, if the roamer successfully passes the registration, validation, and the authentication processes.

Other Fraud Preventive Features

Exemplary embodiments of the present inventions include other fraud preventive features. For example, the wireless units operating with any of the embodiments may be provisioned so as to be locked by the user. To lock a wireless unit against unauthorized use, a user may enter a code (i.e., *PIN## or *IRP##) to lock the wireless unit. This locking may completely disable the wireless unit. Alternatively, this locking may require that the wireless unit be processed so as to include a validation process and/or an authentication process prior to provision of originating service to the unit.

Another fraud feature is referred to herein as an authorization period. The response (or the QualificationDirective message) received from the international gateway by the MSC-V 24 also may include an instruction to the MSC-V 24 with respect to an authorization or authentication period. For example, in high fraud areas, a wireless unit may be registered and/or authenticated with an MSC-V 24 only for a limited amount of time (i.e., an authorization or authentication period) so as to minimize the possibility that the wireless unit 20 may be fraudulently used. Alternatively, the international gateway 10 may keep track of the authorization or authentication period with respect to the wireless unit 20. When the authorization or authentication period has expired, the international gateway 10 may send an MSInactive (Invoke Last) message to the MSC-V 24.

Figure 3:
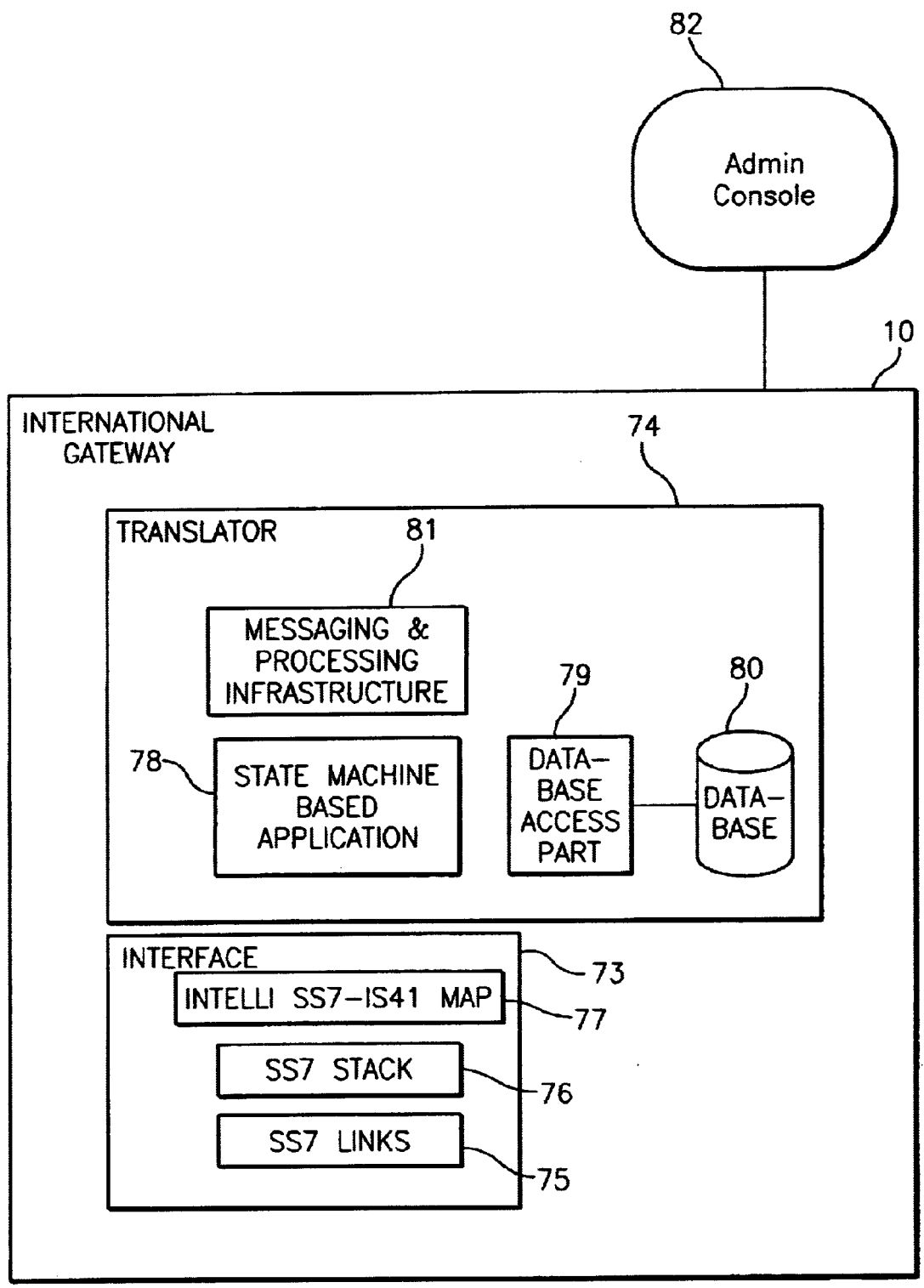
FIG. 3 is a block diagram illustrating an exemplary international gateway.

FIG. 3—An Exemplary International Gateway

FIG. 3 illustrates elements of an exemplary international gateway 10 such as may be used in the exchange of messages and responses between a visited system and a home system and between a visited system and the international gateway functioning as an authentication or verification entity. The international gateway 10 generally includes an interface 73 and a translator 74. The interface 73 functions as a connection to the communications systems (and elements thereof) which the international gateway serves. An exemplary international gateway 10 has an interface 73 that includes SS7 links 75 that receive the messages and responses, and that pass the messages and responses to an SS7 stack 76. The SS7 stack 76 discriminates and passes the messages and responses to an IS-41 message handler such as provided by the IntelliSS7 1-IS41 MAP 77, which is a mapping software. In particular, the SS7 stack 76 passes the data of the IS-41 messages and responses to a parsing library where the message is decoded according to IS-41 standards. In the parsing library, the message type, components, and parameters are located in the received messages and responses and stored, (or a pointer stored) in structures which can be then accessed directly. Once the messages and responses are parsed, the data then is passed to the translator 74 carrying out the appropriate operations.

An exemplary international gateway 10 has a translator 74 that includes a state machine based application 78, which controls or manages each session. In addition, the translator 74 may include a database access part 79 and a database 80 that may contain the table 32 that is used in determining the routing for a registration message received with respect to a particular wireless unit. More information about the database 80 and the information that may be stored in the database 80 or other memory structure is provided below under the heading "Information With Respect to the International Gateway".

Still referring to FIG. 3, the translator 74 may include a messaging and process infrastructure 41. This infrastructure 41 provides services such as message buffering, message passing, timers, task management, etc.

The international gateway 10 also typically includes at least a connection to an administrative console 82. Information regarding a customer and/or a user may be provisioned in the international gateway 10 through the administrative console 82. A service manager may use the administrative console 82 to monitor transactions or view transactions in the transaction log by transaction number or by MIN/ESN. Other statistical information relating to the operation of the international gateway 10 may be obtained or viewed through the administrative console 82.

Further, the international gateway 10 may include an application interface to a network manager that may be accessed and/or operated through the administrative console 82 or through other elements. For example, the network manager may be an Openview Network Manager available from Hewlett Packard. The application interface may be based on a simple network management protocol (SNMP) to generate traps and alarms to the network manager. Traps may include unknown message or response received and/or PIN modification retries failure.

Generally, the international gateway 10 functions in accordance with Signaling System 7 (SS7) protocols as well as EIA/TIA IS-41 protocols, and thus, may be accessed through the connectivity between and among network elements of wireless communications systems and/or wireline communications systems. Preferably, the international gateway 10 supports the American National Standards Institute (ANSI), International Telecommunications Union (ITU) and ITU International variants of the SS7 protocol up to the transaction capabilities application part (TCAP) layer. In particular, the components of the international gateway 10 communicate among themselves and other data networks via TCP/IP connections. The connectivity preferably supports T1/E1 and V.35 at speeds of up to 64 Kbps. It is further preferred that the international gateway 10 generally does not use the Global Title Translation (GTT) in addressing entities or elements in the systems.

Information With Respect to the International Gateway

The international gateway 10 is set up and continually updated with current information as to users, customers, MSC information, etc. so as to facilitate the exchange of messages and responses between a visited system and a home system of a wireless unit and between a visited system and the international gateway acting as an authentication or verification entity with respect to a wireless unit. Generally, the international gateway 10 operates pursuant to IS-41 specifications. For example, the international gateway 10 starts a timer to time the interval between routing a new message and receiving a response to the new message. If appropriate, the international gateway 10 handles a timeout on the response. The international gateway 10 responds with error messages in the appropriate situations. For example, the international gateway 10 responds with a Return Error with an error code of OperationNotSupported if the international gateway 10 receives a message for call delivery to a wireless unit that has not registered, that is outside its authorization period, etc. Error codes may include SystemFailure, ParameterError, UnrecognizedParameterValue; MIN/HLRMismatch, UnrecognizedESN, Operation Sequence Problem, and/or ResourceShortage.

The international gateway 10 may include the table 32 and/or database 80 as well as other memory or storage facilities with respect to the information that is necessary or available with respect to operation of the internationally gateway 10.

User or Subscriber Information

The table 32 or database 80 may include entries or records related to users. Each entry or record may include the following information or a field (which may be empty until filled) for the following information with respect to the user or the wireless unit of the user: a mobile identification number (MN); an electronic serial number (ESN); a user or subscriber name; a personal identification number (PIN); a date-time of last PIN change; a number of retries for PIN change in current interval; an MSC-H; a current MSC-V; a previous MSC-V; a date-time of last successful PIN validation; a number of retries for PIN validation in current interval; a date-time of last Registration Notification; OCOS information returned by the MSC-H; TCOS information returned by the MSC-H; a temporary local dialing number (TLDN); user or subscriber status; calling features mask; carrier digits; billing identification; destination digits; and/or a date-time of first unsuccessful validation attempts in current interval.

The user or subscriber information may be provisioned in the international gateway 10 through the administrative console 82 or in batch mode through bulk updates transferred from customers.

System Information

The international gateway 10 may store system information with respect to the international gateway 10 in the database 80 or in another storage structure. For example, the following system configuration information may be stored: a system type code; a point code; a subsystem number (SSN); and/or a carrier identification code. Also, the system configuration information may include information relating to the use of PINs such as the maximum number of retries and the retry interval. Further, the international gateway may store a point code and a SSN for each of the mobile switching centers (MSCs) or other switches which may serve as either origination or destination points with respect to messages and responses that may be sent to and from the international gateway 10.

Transaction, Tracing and Audit Information

The international gateway 10 generally carries out transaction and tracing functions with respect to the messages and responses that may be sent to and from the international gateway 10. A message and its corresponding response generally is referred to as a transaction, and the message and its corresponding response typically includes a transaction number or other identification of the transaction. The international gateway 10 logs the transaction number into a transaction log (not illustrated), which also may be referred to as log files or into the database 80. Preferably, the log of the transaction includes a timestamp for the transaction. The international gateway 10 may include a tracing mechanism (not illustrated in FIG. 3) and may include four levels of trace messages with each level providing a different amount of detailed information. Also, the international gateway 10 may include audit trails for all changes made to the database, such as changing a PIN, etc. These audit trails may be recorded and stored.

MSC Information

To facilitate the exchange of messages and responses, the international gateway 10 may store information such as attributes with respect to mobile switching centers (MSCs) which are involved in transactions related to a wireless unit. These attributes may include: an MSC identification; a location; a point code; a subsystem number (SSN); an HLR identification (null if co-located with the MSC); an HLR point code; an HLR SSN; a VLR identification (null if co-located with the MSC); a VLR point code; a VLR subsystem number (SSN); an authentication center (AC) identification; an AC point code; and/or an AC SSN. This information may be stored in the database 80 or in some other memory structure. An exemplary embodiment of the international gateway 80 stores this information in a functional entity messaging relationship table (FEMR table).

Home-Visited Relationship

The international gateway 10 may include a table or other structure that sets forth a relationship including operating or override values between mobile switching centers (MSCs) in a home-visited relationship. This table may be used by the international gateway 10 to override values that are present in the user or subscriber entry or record when appropriate. For example, the visited MSC may be located in a high fraud area. In that case, an authorization period with respect to the registration, authentication, or provision of communications service to a wireless unit may be instituted through the provision of instructions from the MSC-H or the international gateway to the MSC-V or otherwise. Thus, this table may include the following attributes, information or fields: MSC-H identification; MSC-V identification; authorization period; and/or authorization value.

MSC-NPA Information

The international gateway 10 may have to determine the MSC-H of a particular wireless unit based on the information that is provided to the international gateway 10 by the MSC-V. Typically, the international gateway 10 uses the MIN of the wireless unit to find the MSC-H (and its point code) by using an MSC-NPA information table. Particularly, the MIN may be compared to the entries of NPA-NXX-x blocks that are stored in the table to determine the NPA-NXX-x block corresponding to the MIN, and then to determine the MSC-H (and its point code) serving the NPA-NXX-x block corresponding to the MIN. Thus, an entry in the MSC-NPA information table may include the following fields, attributes or information: MSC-H identification; and NPA-NXX-x block (being served by the MSC-H of the entry).

Figure 4:
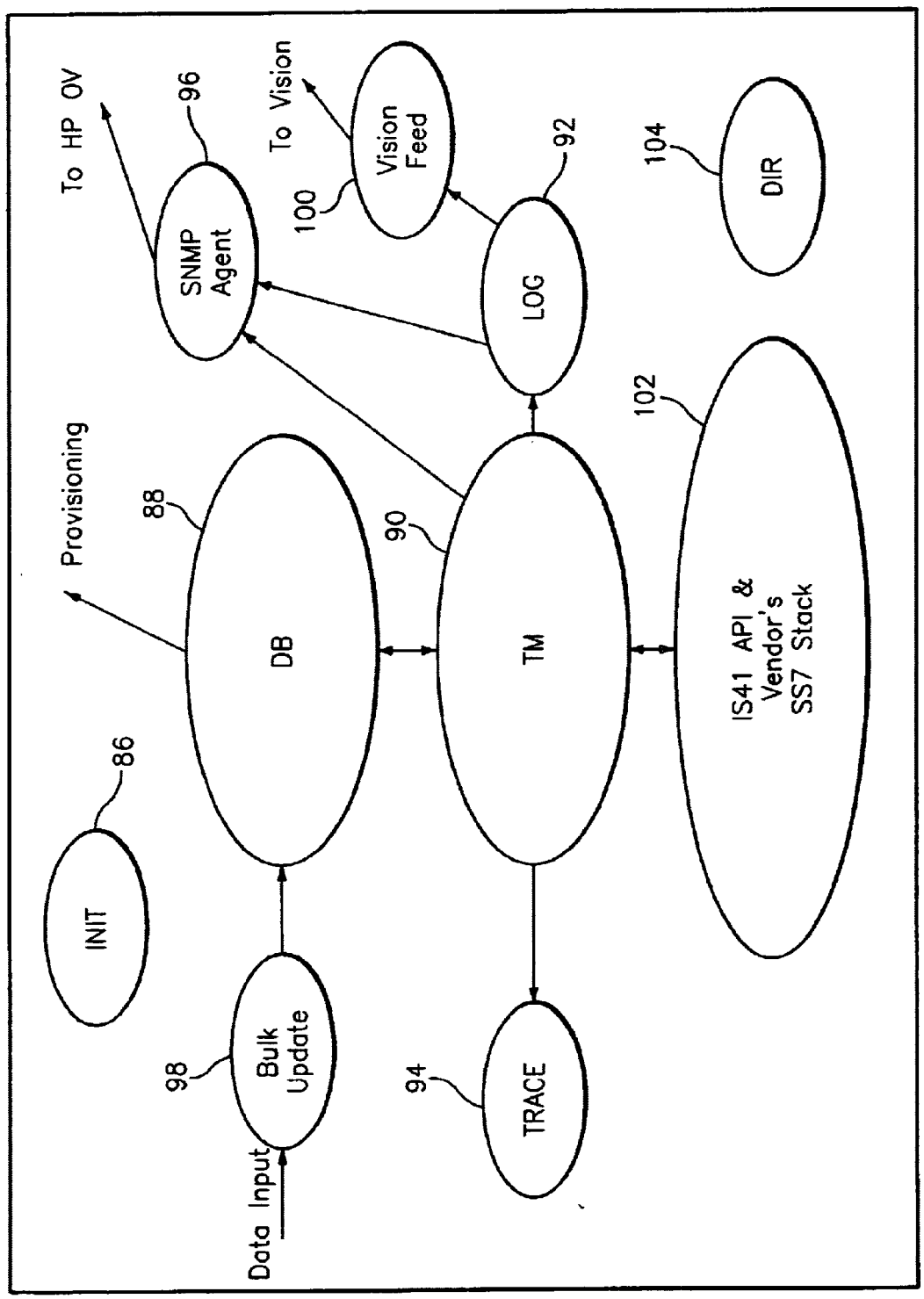
FIG. 4 is diagram of logical software entities in an exemplary international gateway.

FIG. 4—Logical Software Entities of an Exemplary International Gateway

To facilitate the understanding of the operation of an exemplary international gateway 10, FIG. 4 presents a diagram of logical software entities or modules of such a gateway. The modules are presented in the diagram from a logical standpoint. They do not represent separate processes that run the international gateway 10, but rather, each module presents a functionality that may be used in the gateway.

The modules include INIT 86 which is an initialization function that brings up and monitors the application processes on the international gateway 10. DB 88 is a database interface in the form of a functional application program interface (API) for interaction with a user. DB 88 also includes the database server part that is provided by the vendor of the database. TM 90 is a transaction manager which registers with the SS7 processes to gain access to the SS7 stack. The transaction manager 90 receives and sends IS-41 messages and responses through the SS7 processes. The transaction manager 90 links with the DB 88 in order to use the database server.

Log 92 is a library that provides a functional API to record every IS-41 message and response that is sent and received. This API is used to record all of the IS-41 messages and responses that pass through the international gateway 10. Trace 94 is a library that provides debugging aids for integration and testing. SNMP Agent 96 is a process that forwards simple network management protocol (SNMP) traps to the network manager such as the Openview Network Manager from Hewlett Packard. This SNMP Agent 96 also provides a message queue for the other application software entities to send event/alarm information, which is converted to a trap and forwarded as appropriate.

Bulk Update 98 is a script that updates the database with large numbers of records or entries, generally with respect to users. Vision Feed 100 is a process that provides a continuous feed of all IS-41 messages and responses being sent and received by the international gateway 10 to a separate entity for further processing (billing, debugging, network problems, etc.). IS-41 API & Vendor's SS7 102 stack is an IS-41 API built on top of the SS7 stack. The SS7 stack functionality is handled within separate processes, i.e., they are not libraries. The IS-41 API is incorporated in these separate processes. DIR 104 is a platform configuration task called the Director. It provides a command line interface for configuring the SS7 stack and all network parameters associated with setting up the international gateway 10 as a functional network entity. The DIR 104 also can be used to control the SS7 stack processes.

Conclusion

In sum, the present inventions include methods, systems, and apparatus that substantially prevent the fraudulent use of wireless units roaming in visited systems. After successful registration of a wireless unit in a visited system, the visited system implements at least the denial of originating communication service to the wireless unit. Advantageously, the present inventions substantially prevent the fraudulent use of wireless units roaming in visited systems by requiring such units to undergo a verification or authentication process prior to being allowed to make calls. By these inventions, a roamer is only allowed to make a call in a visited system, if the roamer successfully passes the registration, validation, and the authentication processes.

The exemplary embodiments also may include additional anti-fraud features such as the limitation of an authentication or verification period for the provision of communications service to the wireless unit in the visited system.

From the foregoing description of the exemplary embodiments and the several alternatives, other alternative constructions of the present invention may suggest themselves to those skilled in the art. Therefore, the scope of the present invention is to be limited only to the claims below and the equivalents thereof.

We claim:

1. A method to prevent fraudulent use of a wireless unit that is roaming in a visited system, the method comprising:
  as a part of registration of the wireless unit with a visited mobile switching center (MSC-V) of the visited system, causing the MSC-V to implement denial of originating communication service with respect to the wireless unit;
  after the registration of the wireless unit with the MSC-V and the denial of the originating communication service with respect to the wireless unit, receiving at the MSC-V a code and identification information from the wireless unit;
  in response to the receipt of the code, causing the MSC-V to transmit a message including the identification information to a verification element functionally connected to the visited system and a home system of the wireless unit;
  in response to receipt of the message, causing the verification element to carry out a verification of the identification information;
  in response to making a positive verification, causing the verification element to transit a response to the MSC-V, the response including the positive verification; and based on the positive verification received in the response, causing the MSC-V to remove the denial of the originating communication service with respect to the wireless unit, thereby initiating the communication service with respect to the wireless unit, wherein prior to receiving at the MSC-V the code and the identification information from the wireless unit, the method further comprises:

receiving at the MSC-V a call attempt from the wireless unit; and causing the MSC-V in response to the call attempt to provide the wireless unit with an announcement.

2. The method of claim 1, wherein the response including the positive verification comprises origination/termination service information; and wherein the method further comprises:

causing the MSC-V to update information the MSC-V retains in a visitor location resister (VLR) relating to the wireless unit with the origination/termination service information; and after removal of the denial of the originating communication service with respect to the wireless unit, causing the MSC-V to provide communication services to the wireless unit based on the origination/termination service information.

3. The method of claim 1, wherein the message including the identification information comprises a feature request message, and wherein the identification information comprises a personal identification number (PIN); and wherein causing the MSC-V to transmit a message comprises causing the MSC-V to transmit the feature request message including the PIN to the verification element.

4. The method of claim 3, wherein the response comprises a feature request response; and wherein causing the verification element to transmit a response to the MSC-V comprises causing the verification element to transmit a feature request response to the MSC-V.

5. The method of claim 1, wherein the announcement comprises an instruction to the wireless unit to dial the code and provide the identification information.

6. A system to prevent fraudulent use of a wireless unit that is roaming in a visited system, the system comprising:

a visited mobile switching center (MSC-V) operative to carry out a registration of the wireless unit in the visited system, to implement, after the registration, denial of originating communication service with respect to the wireless unit;

to receive after the denial, a code and identification information in a call from the wireless unit;

to recognize the code as a feature request with respect to a network element, and to route a feature request message including the identification information to the network element;

the network element operative in response to receipt of the identification information to provide a verification in a feature request response to the MSC-V, the network element being functionally connected to the visited system and a home system of the wireless unit; and the MSC-V also operative to remove the denial if the verification comprises a positive verification, wherein, after the registration of the wireless unit with the visited system and prior to the denial of originating communication service to the wireless unit the MSC-V is operative to receive a call attempt from the wireless unit, and in response to the call attempt, is operative to provide an instruction to the wireless unit to dial the code and provide the identification information.

7. The system of claim 6 wherein the feature request response from the network element comprises origination/termination service information with respect to the wireless unit;

wherein the MSSC-V comprises a visitor location register (VLR) including information relating to the wireless unit; and wherein the MSC-V is operative to update the information in the VLR with the origination/termination service information.

8. The system of claim 7, wherein, after the removal of the denial, the MSC-V is operative to provide communication services to the wireless unit based on the origination/termination service information.

* * * * *